(12) United States Patent
Nishikawa

(10) Patent No.: US 10,298,508 B2
(45) Date of Patent: May 21, 2019

(54) COMMUNICATION SYSTEM, RECEIVING-SIDE APPARATUS AND TRANSMISSION-SIDE APPARATUS

(71) Applicant: NEC Corporation, Minato-ku, Tokyo (JP)

(72) Inventor: Yoshiaki Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 15/306,170

(22) PCT Filed: May 11, 2015

(86) PCT No.: PCT/JP2015/002375
§ 371 (c)(1),
(2) Date: Oct. 24, 2016

(87) PCT Pub. No.: WO2015/174069
PCT Pub. Date: Nov. 19, 2015

(65) Prior Publication Data
US 2017/0048124 A1 Feb. 16, 2017

(30) Foreign Application Priority Data
May 14, 2014 (JP) .................................. 2014-100059

(51) Int. Cl.
*H04L 12/26* (2006.01)
*H04L 12/835* (2013.01)

(52) U.S. Cl.
CPC .......... *H04L 47/30* (2013.01); *H04L 43/0882* (2013.01); *H04L 43/0858* (2013.01); *H04L 43/106* (2013.01)

(58) Field of Classification Search
None
See application file for complete search history.

(56) References Cited

U.S. PATENT DOCUMENTS 5,477,531 A * 12/1995 McKee ................... H04L 1/243
370/249
6,976,087 B1 * 12/2005 Westfall .............. H04L 43/0852
370/238
(Continued)

FOREIGN PATENT DOCUMENTS

JP 2004-312725 A 11/2004
JP 2011-142622 A 7/2011
(Continued)

OTHER PUBLICATIONS

International Search Report for PCT Application No. PCT/JP2015/002375, dated Jul. 21, 2015.
(Continued)

*Primary Examiner* — Ayaz R Sheikh
*Assistant Examiner* — Tarell A Hampton

(57) ABSTRACT

A communication system includes: a transmission unit configured to transmit each of a plurality of measurement packets at a predetermined transmission interval; a reception unit configured to receive the plurality of measurement packets which have passed through a predetermined network for a predetermined number of times; and an available bandwidth estimation unit configured to calculate a cumulative value of a queuing delay by using reception time information indicating temporal information about reception of the measurement packets and transmission time information indicating temporal information about transmission of the measurement packets, and estimate an available bandwidth of the network by using the calculated cumulative value of the queuing delay.

8 Claims, 7 Drawing Sheets

(56) References Cited

U.S. PATENT DOCUMENTS

| | | | |
|---|---|---|---|
| 6,996,132 B1* | 2/2006 | Tolety | H04L 43/50 370/252 |
| 2007/0217448 A1* | 9/2007 | Luo | H04L 47/10 370/468 |
| 2008/0095187 A1* | 4/2008 | Jung | H04L 41/0896 370/468 |

FOREIGN PATENT DOCUMENTS

| | | |
|---|---|---|
| JP | 2013-121029 A | 6/2013 |
| JP | 2013-251828 A | 12/2013 |
| WO | 2014/017140 A1 | 7/2016 |

OTHER PUBLICATIONS

English translation of Written opinion for PCT Application No. PCT/JP2015/002375.

* cited by examiner

COMMUNICATION SYSTEM, RECEIVING-SIDE APPARATUS AND TRANSMISSION-SIDE APPARATUS

This application is a National Stage Entry of PCT/JP2015/002375 filed on May 11, 2015, which claims priority from Japanese Patent Application 2014-100059 filed on May 14, 2014, the contents of all of which are incorporated herein by reference, in their entirety.

TECHNICAL FIELD

The present invention relates to a communication system, a receiving-side apparatus, a transmission-side apparatus, and a communication method.

BACKGROUND ART

Currently, a network such as the Internet is constituted by equipments having a variety of communication resources, and a variety of communications are taken place in such a network. This requires grasping a status of the network such as a delay or an available bandwidth. As such a network measurement technique, an active measurement in which a status in a network is measured by transmitting data (a packet) for measurement to the network is known.

Patent Literature 1 describes a system in which a plurality of measurement packets whose packet size increases or decreases sequentially are transmitted at a predetermined transmission interval, reception intervals of the measurement packets are measured, and the transmission interval of the measurement packet is compared with the reception intervals to calculate an available bandwidth. In this system, an available bandwidth is calculated by using a measurement packet whose packet size is the largest among measurement packets in which the reception interval is equal to the transmission interval.

Patent Literature 2 describes generation of an estimate value of a QoS (Quality of Service) parameter (for example, available bandwidth) by transmitting an ICMP (Internet Control Message Protocol) time stamp request to all routers on an end-to-end path.

CITATION LIST

Patent Literature

PTL 1: Japanese Unexamined Patent Application Publication No. 2011-142622
PTL 2: Japanese Unexamined Patent Application Publication No. 2004-312725

SUMMARY OF INVENTION

Technical Problem

However, in the above-described techniques, precision for estimating an available bandwidth is low in some cases.

For example, in a network bandwidth measurement system described in Patent Literature 1, an available bandwidth is calculated based on a packet size and a transmission interval of a measurement packet transmitted before a measurement packet in which a reception interval is larger than a transmission interval.

In this case, in the network bandwidth measurement system, in order to calculate an available bandwidth, a transmission interval and a packet size need to be set to each measurement packet of a plurality of measurement packets constituting a packet train such that a queuing delay occurs. In other words, in the network bandwidth measurement system, a transmission interval and a packet size of the measurement packet are set in such a way that an instantaneous used bandwidth of a packet train composed of a plurality of measurement packets is larger than an available bandwidth to be estimated.

Here, on a network such as an IP (Internet Protocol) network, the packet size of a measurement packet to be transmitted is set in such a way that the packet size of a measurement packet to be transmitted is within a packet size which can pass a network such as the IP network since the packet size of one packet has an upper limit. For this reason, when a wider available bandwidth is estimated, a transmission interval of a measurement packet included in a packet train needs to be set short.

However, when a transmission interval of a measurement packet is set short, a difference between an interval which is actually transmitted (actual transmission interval) and a transmission interval which is set (set transmission interval) is large depending on the performance of a transmission-side apparatus. In this case, since a reception-side apparatus which does not know an actual transmission interval calculates a queuing delay by using a set transmission interval, the queuing delay is a value different from an actual queuing delay. Therefore, since in a technique described in Patent Literature 1, an available bandwidth can be estimated by using a queuing delay which is different from an actual queuing delay, an estimation precision of the available bandwidth can be low.

The present invention has been made in view of the above-described problems, and an object of the present invention is to provide a technique in which an available bandwidth is estimated with a high precision.

Solution to Problem

A communication system according to one aspect of the present invention includes: transmission means for transmitting each of a plurality of measurement packets at a predetermined transmission interval; reception means for receiving the plurality of measurement packets which have passed through a predetermined network for a predetermined number of times; and available bandwidth estimation means for calculating a cumulative value of a queuing delay by using reception time information indicating temporal information about reception of the measurement packets and transmission time information indicating temporal information about transmission of the measurement packets, and for estimating an available bandwidth of the network by using the calculated cumulative value of the queuing delay.

A received-side apparatus according to one aspect of the present invention, which receives data from a transmission-side apparatus communicatively connected via a network, includes: reception means for receiving a plurality of measurement packets, and transmission time information indicating temporal information about transmission of the measurement packets transmitted from the transmission-side apparatus; and available bandwidth estimation means for calculating a cumulative value of a queuing delay by using reception time information indicating temporal information about reception of the measurement packets and the transmission time information received by the reception means, and for estimating an available bandwidth by using the calculated cumulative value of the queuing delay.

A transmitting-side apparatus according to one aspect of the present invention, which transmits data to a receiving-side apparatus communicatively connected via a network, includes: transmission means for transmitting each of a plurality of measurement packets to the receiving-side apparatus at a predetermined transmission interval; reception means for receiving the plurality of measurement packets returned from the receiving-side apparatus; and available bandwidth estimation means for calculating a cumulative value of a queuing delay by using reception time information indicating temporal information about reception of the measurement packets and transmission time information indicating temporal information about transmission of the measurement packets, and for estimating an available bandwidth by using the calculated cumulative value of the queuing delay.

A communication method according to one aspect of the present invention includes: transmitting each of a plurality of measurement packets at a predetermined transmission interval; receiving the plurality of measurement packets which have passed through a predetermined network for a predetermined number of times; and calculating a cumulative value of a queuing delay by using reception time information indicating temporal information about reception of the measurement packets and transmission time information indicating temporal information about transmission of the measurement packets, and estimating an available bandwidth of the network by using the calculated cumulative value of the queuing delay.

It is noted that a computer program which realizes the communication system, the transmission-side apparatus, the receiving-side apparatus, or the communication method by a computer, and a computer-readable storage medium which stores the computer program are also included in the scope of the present invention.

Advantageous Effects of Invention

According to the present invention, an available bandwidth can be estimated with a higher precision.

DESCRIPTION OF EMBODIMENTS

<First Exemplary Embodiment>

Figure 1:
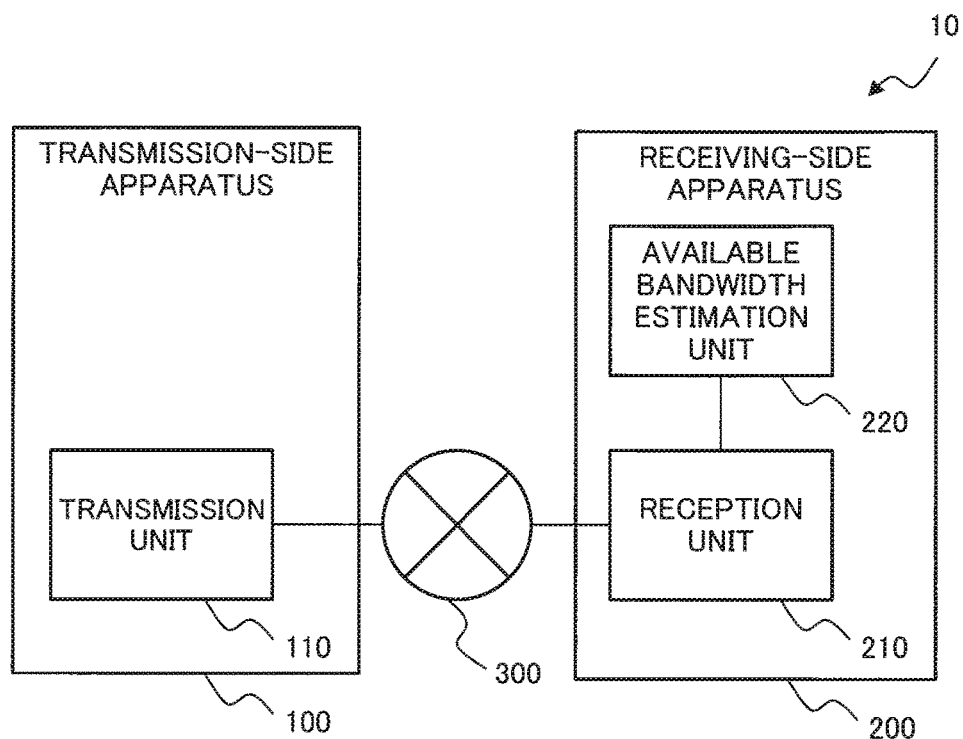
FIG. 1 is a diagram illustrating one example of a configuration of a communication system and a functional configuration of each apparatus included in the communication system according to a first exemplary embodiment of the present invention.

A first exemplary embodiment of the present invention will be described in detail with reference to drawings. FIG. 1 is a diagram illustrating one example of a configuration of a communication system and a functional configuration of each apparatus included in the communication system according to the exemplary embodiment. As shown in FIG. 1, a communication system 10 includes a transmission-side apparatus 100 and a receiving-side apparatus 200. The transmission-side apparatus 100 and the receiving-side apparatus 200 are communicatively connected with each other via a network 300. The communication system 10 as shown in FIG. 1 is one example, and the present exemplary embodiment is not limited thereto. For example, the communication system 10 may include a plurality of transmission-side apparatuses 100 and a plurality of receiving-side apparatuses 200, or may include an apparatus other than the transmission-side apparatus 100 and the receiving-side apparatus 200.

Each communication means between the apparatuses is not particularly limited, and may be, for example, TCP (Transmission Control Protocol), UDP (User Datagram Protocol), ICMP (Internet Control Message Protocol), IP (Internet Protocol), or the like, or another means.

(Transmission-Side Apparatus 100)

Next, the configuration of the transmission-side apparatus 100 will be described. As shown in FIG. 1, the transmission-side apparatus 100 includes a transmission unit 110.

The transmission unit 110 is means for transmitting data to the network 300. The transmission unit 110 generates a packet train from a plurality of measurement packets for being transmitted to the receiving-side apparatus 200. The transmission unit 110 then transmits the packet train composed of a plurality of measurement packets to the receiving-side apparatus 200 via the network 300. Specifically, the transmission unit 110 transmits a plurality of measurement packets included in the packet train sequentially at a predetermined transmission interval. Here, the transmission interval is an interval at which a plurality of measurement packets constituting the packet train are transmitted. Hereinafter, a transmission interval is also referred to as a packet interval of a packet train. A predetermined transmission interval is a preset transmission interval. The predetermined transmission interval may be stored in an unillustrated storage apparatus. Hereinafter, a preset transmission interval is also referred to as a set transmission interval.

Since a specific method of transmitting a packet train is not particularly limited, and, for example, a technique described in Patent Literature 1 is used, description of such a method will be omitted in the present exemplary embodiment.

The transmission unit 110 transmits transmission time information of a transmitted measurement packet to the receiving-side apparatus 200 via the network 300. The transmission time information refers to temporal information about transmission of a measurement packet. For example, transmission time information is information indicating a time at which the measurement packet is transmitted. The transmission time information is not limited thereto, and may be information indicating an actual transmission interval of the measurement packet. The actual transmission interval is a time between a transmission time of an actually transmitted certain measurement packet and a transmission time of the subsequently actually transmitted measurement packet. This actual transmission interval is distinguished from the above-described set transmission interval, and also referred to as an actual transmission interval. The transmission time information may be information indicating a difference between the set transmission interval and the actual transmission interval.

The transmission time information may be a combination of the information indicating the time at which the measurement packet is transmitted, the information indicating the actual transmission interval of the measurement packet, and the information indicating the difference between the set transmission interval and the actual transmission interval.
(Receiving-Side Apparatus 200)

Next, the configuration of the receiving-side apparatus 200 will be described. As shown in FIG. 1, the receiving-side apparatus 200 includes a reception unit 210 and an available bandwidth estimation unit 220.

The reception unit 210 is means for receiving data from the transmission-side apparatus 100 via the network 300. The reception unit 210 receives the plurality of measurement packets constituting the packet train transmitted from the transmission-side apparatus 100. The reception unit 210 then provides reception time information of the measurement packet to the available bandwidth estimation unit 220.

Here, the reception time information refers to temporal information about reception of the measurement packet. The reception time information is, for example, information indicating a time at which the measurement packet is received. The reception time information is not limited thereto, and may be information indicating a reception interval of the measurement packet.

Since a specific method of receiving a packet train is not particularly limited, and, for example, a technique described in Patent Literature 1 is used, description of such a method will be omitted in the present exemplary embodiment.

The reception unit 210 receives the transmission time information transmitted from the transmission-side apparatus 100. The reception unit 210 then provides the received transmission time information to the available bandwidth estimation unit 220.

The available bandwidth estimation unit 220 calculates a cumulative value (cumulative queuing delay) of a queuing delay by using the reception time information and the transmission time information. The available bandwidth estimation unit 220 then estimates an available bandwidth by using the calculated cumulative queuing delay. Since a method of estimating the available bandwidth in the available bandwidth estimation unit 220 according to the present exemplary embodiment is performed, for example, by using a technique described in Patent Literature 1, a detailed description will be omitted.
(Operation of Communication System 10)

Figure 2:
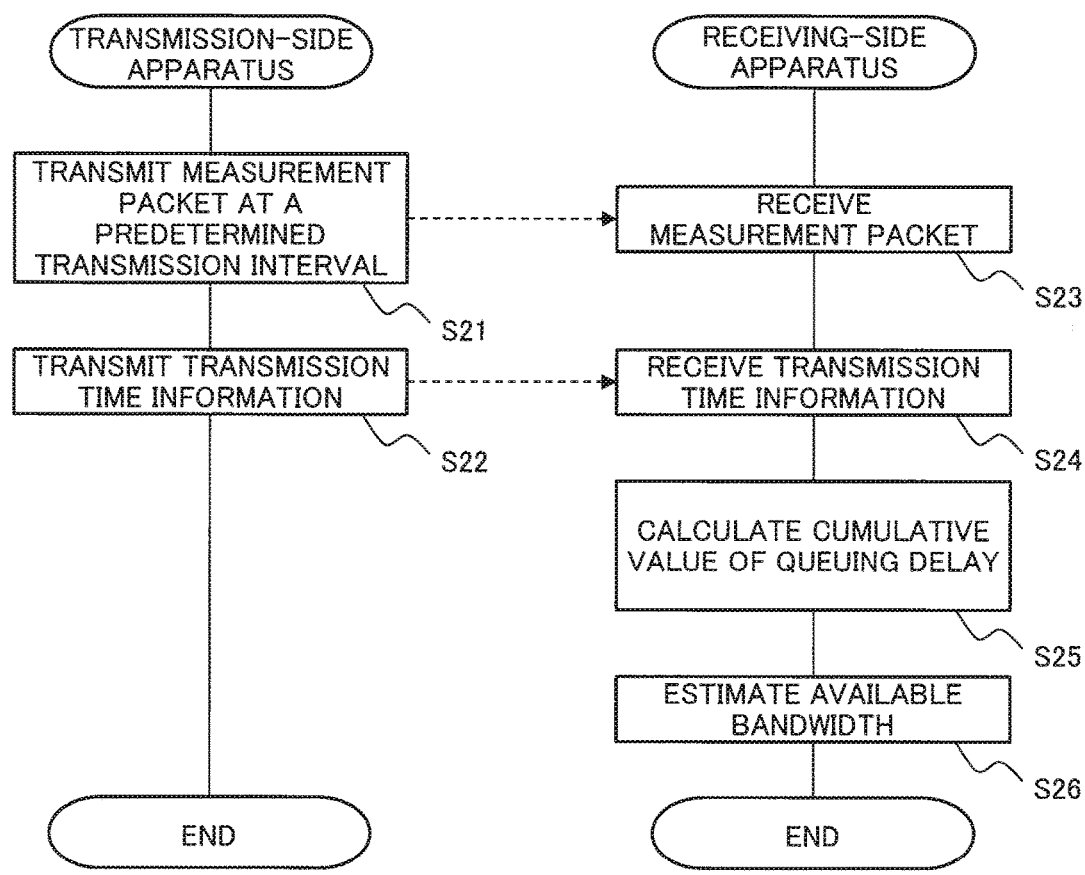
FIG. 2 is a flow chart illustrating one example of a flow of processing of the communication system according to the first exemplary embodiment of the present invention.

Next, with reference to FIG. 2, an operation of the communication system 10 according to the present exemplary embodiment will be described. FIG. 2 is a flow chart illustrating one example of a flow of processing of the communication system 10 according to the exemplary embodiment.

In FIG. 2, a flow chart on the left represents a flow of processing of the transmission-side apparatus 100, and a flow chart on the right represents a flow of processing of the receiving-side apparatus 200. A dashed line arrow represents a flow of information (data) between the transmission-side apparatus 100 and the receiving-side apparatus 200.

First, the transmission unit 110 of the transmission-side apparatus 100 sequentially transmits a plurality of measurement packets included in a packet train at a predetermined transmission interval to the receiving-side apparatus 200 (step S21).

Subsequently, the transmission unit 110 of the transmission-side apparatus 100 transmits transmission time information of the transmitted measurement packet to the receiving-side apparatus 200 (step S22).

Here, when the transmission time information is information indicating a time at which the measurement packet is transmitted, the transmission unit 110 may the transmit transmission time information every time the measurement packet is transmitted. In the above-described case, the transmission unit 110 may, after transmitting all measurement packets, transmit transmission time information of all the measurement packets in the order in which the measurement packets are transmitted, or may transmit transmission time information together with information identifying which transmission time information belongs to which measurement packet.

When the transmission time information is information indicating an actual transmission interval of a measurement packet, the transmission unit 110 may, after transmitting two or more measurement packets, transmit information indicating a transmission interval for these measurement packets as the transmission time information. In the above-described case, the transmission unit 110 may, after transmitting all measurement packets, transmit the transmission time information in the order in which the measurement packets are received, or may transmit the measurement packets together with information identifying which transmission time information is between which measurement packets.

When the transmission time information is information indicating a difference between the set transmission interval and the actual transmission interval, the transmission unit 110 may, after transmitting two or more measurement packets, transmit a difference between a transmission interval for these measurement packets (actual transmission interval) and the set transmission interval as the transmission time information. In the above-described case, the transmission unit 110 may, after transmitting all measurement packets, transmit the transmission time information in the order in which the measurement packets are received, or may transmit together with information identifying which transmission time information is between which measurement packets.

Next, an operation of the receiving-side apparatus 200 will be described.

The reception unit 210 of the receiving-side apparatus 200 receives the measurement packet transmitted from the transmission-side apparatus 100 in step S21 (step S23).

The reception unit 210 of the receiving-side apparatus 200 then receives the transmission time information transmitted from the transmission-side apparatus 100 in step S22 (step S24).

The available bandwidth estimation unit 220 of the receiving-side apparatus 200 then calculates a cumulative queuing delay by using reception time information of a plurality of measurement packets (a packet train) received by the reception unit 210 in step S23 and the transmission time information received by the reception unit 210 in step S24 (step S25).

Subsequently, the available bandwidth estimation unit 220 of the receiving-side apparatus 200 estimates an available bandwidth by using the calculated cumulative queuing delay (step S26), and terminates the processing.

Next, a flow of the communication system 10 according to the present exemplary embodiment will be described by example. The transmission-side apparatus 100 and the receiving-side apparatus 200 of the communication system 10 are communicable with each other by UDP.

Here, a preset packet interval (set transmission interval) of a packet train is 1 ms. The packet train consists of five measurement packets, whose packet sizes are 100 bytes, 110 bytes, 120 bytes, 130 bytes, and 140 bytes, respectively.

In the present specific example, the transmission time information and the reception time information are an actual transmission interval and a reception interval, respectively. It is assumed that the order of measurement packets are not changed in a network, and actual transmission intervals and reception intervals are both in the order in which packets are transmitted.

The transmission unit 110 tries transmission at the set transmission interval. In this case, a transmission interval actually transmitted by the transmission unit 110 is 1.0 ms, 0.8 ms, 0.9 ms, and 0.9 ms in the order in which the measurement packets are transmitted. The transmission unit 110 transmits the actual transmission intervals "1.0 ms, 0.8 ms, 0.9 ms, 0.9 ms" as the transmission time information to the receiving-side apparatus 200.

Next, the reception unit 210 of the receiving-side apparatus 200 receives the packet train transmitted by the transmission unit 110. In this case, reception intervals at which the reception unit 210 received the measurement packets are 1.0 ms, 1.0 ms, 1.0 ms, and 1.0 ms in the order in which the measurement packets are received. The reception unit 210 provides the reception intervals, "1.0 ms, 1.0 ms, 1.0 ms, 1.0 ms" as the reception time information to the available bandwidth estimation unit 220.

The reception unit 210 of the receiving-side apparatus 200 receives the transmission time information, "1.0 ms, 0.8 ms, 0.9 ms, 0.9 ms" transmitted by the transmission unit 110. The reception unit 210 provides the received transmission time information, "1.0 ms, 0.8 ms, 0.9 ms, 0.9 ms" to the available bandwidth estimation unit 220.

The available bandwidth estimation unit 220 of the receiving-side apparatus 200 calculates a cumulative queuing delay by using the reception time information and the transmission time information provided from the reception unit 210. A cumulative queuing delay of a measurement packet which is transmitted n-th (referred to as a measurement packet n) is obtained, for example, by calculating the sum of interval differences (reception interval−transmission interval) for measurement packet 1 to measurement packet n. In other words, the available bandwidth estimation unit 220 calculates a cumulative queuing delay "0 ms, 0.2 ms, 0.3 ms, 0.4 ms" from the reception time information and the transmission time information.

(Effect)

As described above, the communication system 10 according to the present exemplary embodiment includes the transmission-side apparatus 100 and the receiving-side apparatus 200 which are communicatively connected with each other via the network 300.

By such a communication system 10, an available bandwidth can be estimated with higher precision.

This is because the transmission unit 110 of the transmission-side apparatus 100 transmits each of a plurality of measurement packets at a predetermined transmission interval, and further transmits transmission time information indicating temporal information about transmission of the measurement packet. This is also because the reception unit 210 of the receiving-side apparatus 200 receives the plurality of measurement packets transmitted from the transmission-side apparatus 100 and the transmission time information. This is further because the available bandwidth estimation unit 220 of the receiving-side apparatus 200 calculates a cumulative value of a queuing delay by using reception time information indicating temporal information about reception of the measurement packet and the transmission time information, and estimates an available bandwidth by using the calculated cumulative value of the queuing delay.

Since the communication system 10 according to the present exemplary embodiment transmits, from the transmission-side apparatus 100 to the receiving-side apparatus 200, the transmission time information of the measurement packet actually transmitted from the transmission-side apparatus 100 to the receiving-side apparatus 200, the receiving-side apparatus 200 can know an actual transmission interval of the measurement packet.

The available bandwidth estimation unit 220 of the receiving-side apparatus 200 can then calculate a cumulative value of an actual queuing delay.

For example, when the receiving-side apparatus 200 does not acquire the transmission time information from the transmission-side apparatus 100, the receiving-side apparatus 200 assumes that the actual transmission interval is equal to the set transmission interval, and calculates a cumulative queuing delay. In this case, since the set transmission interval agrees with a reception interval, the cumulative queuing delay is "0 ms, 0 ms, 0 ms, 0 ms".

As described above, when the actual transmission interval is not used, the cumulative queuing delay may not be an accurate value. When a wider available bandwidth is estimated, a difference between the actual transmission interval and the set transmission interval is considerably large. Therefore, when a cumulative queuing delay is calculated without the actual transmission interval, an accurate value is not obtained, and therefore, an estimation precision of an available bandwidth which is estimated by using such the cumulative queuing delay is low.

However, since the receiving-side apparatus 200 of the communication system 10 according to the present exemplary embodiment calculates a cumulative queuing delay by using the transmission time information, a difference between the actual transmission interval and the reception interval, "0 ms, 0.2 ms, 0.1 ms, 0.1 ms" can be obtained. Therefore, a cumulative queuing delay is "0 ms, 0.2 ms, 0.3 ms, 0.4 ms", and the receiving-side apparatus 200 can calculate the cumulative queuing delay reflecting the actual amount of delay.

As described above, the available bandwidth estimation unit 220 can estimate an available bandwidth by using the cumulative value of the queuing delay calculated by using the actual transmission interval. Therefore, the communication system 10 according to the present exemplary embodiment can estimate an available bandwidth with high precision, for example, even when a difference between an actual transmission interval for a plurality of measurement packets of a packet train and a set transmission interval is considerably large.

<Second Exemplary Embodiment>

Next, a second exemplary embodiment of the present invention will be described with reference to drawings. For the convenience of explanation, a member having the same function as that of a member included in the drawings described in the above-described first exemplary embodiment is denoted by the same reference sign, and the description thereof will be omitted.

In the above-described first exemplary embodiment, a configuration in which a measurement packet and transmission time information are separately transmitted has been described. In the present exemplary embodiment, a configuration in which a measurement packet is transmitted together with transmission time information will be described.

Figure 3:
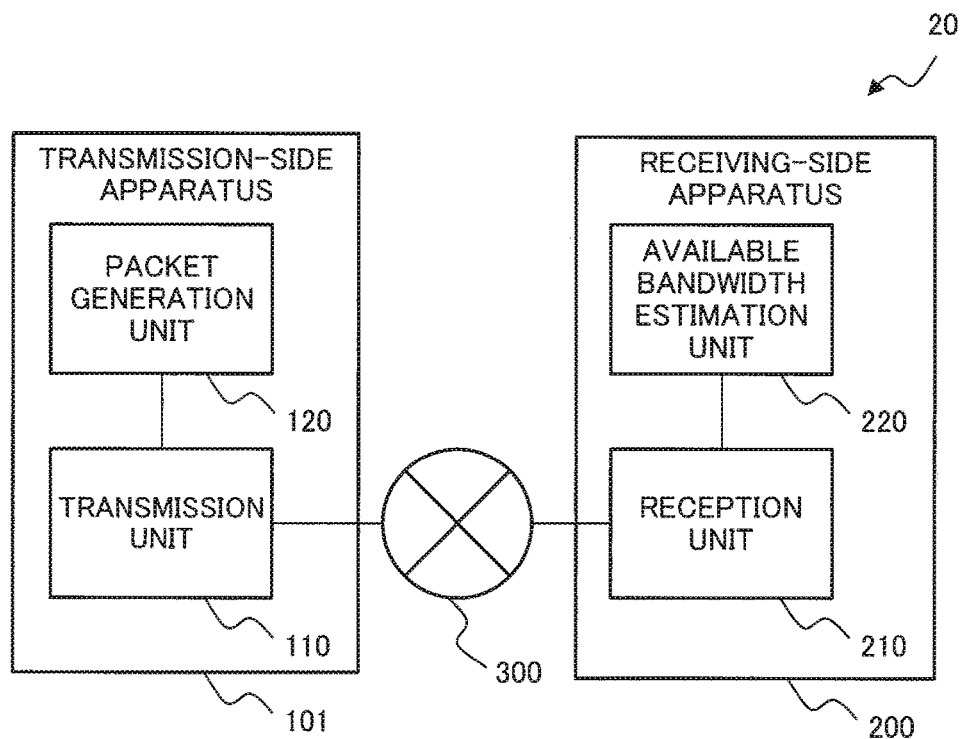
FIG. 3 is a diagram illustrating one example of a configuration of a communication system and a functional configuration of each apparatus included in the communication system according to a second exemplary embodiment of the present invention.

FIG. 3 is a diagram illustrating one example of a configuration of a communication system and a functional configuration of each apparatus included in the communication system according to the exemplary embodiment. As shown in FIG. 3, a communication system 20 includes a transmission-side apparatus 101 and the receiving-side apparatus 200. Similarly to the transmission-side apparatus 100, the transmission-side apparatus 101 and the receiving-side apparatus 200 are communicatively connected with each other via the network 300. Similarly to the first exemplary embodiment, communication means between apparatuses is not particularly limited.

As shown in FIG. 3, the transmission-side apparatus 101 has a configuration in which the transmission-side apparatus 100 according to the first exemplary embodiment includes a packet generation unit 120.

The packet generation unit 120 generates a measurement packet in which transmission time information for a transmitted measurement packet and a measurement packet which has not been transmitted are combined. In other words, the packet generation unit 120 embeds transmission time information of transmitted measurement packet in a packet train in a measurement packet in the packet train to be transmitted. In this case, the size of the measurement packet in which the transmission time information is embedded, is equal to a set packet size of a measurement packet in the packet train.

For example, the packet size of the measurement packet in the packet train is set to 50 bytes. The measurement packet, for example, has a header size of 45 bytes when it is transmitted by UDP. Further, a transmission interval (transmission time information) between a previous measurement packet of the measurement packet, the previous measurement packet being transmitted, and a measurement packet before the precious measurement packet is "0.9 ms".

In this case, the packet generation unit 120 generates information indicating transmission time information having 5 bytes which is obtained by subtracting a header size from the packet size. The packet generation unit 120 then generates a measurement packet having 50 bytes by combining the 5-byte information and a 45-byte header.

Here, information indicating the transmission time information and having 5 bytes may be data having any format. For example, as "0.9 ms" as described above, in the case of a character string by which one character expresses 1 byte, the packet generation unit 120 may generate 5-byte information indicating the transmission time information in text data.

(Operation of Communication System 20)

Figure 4:
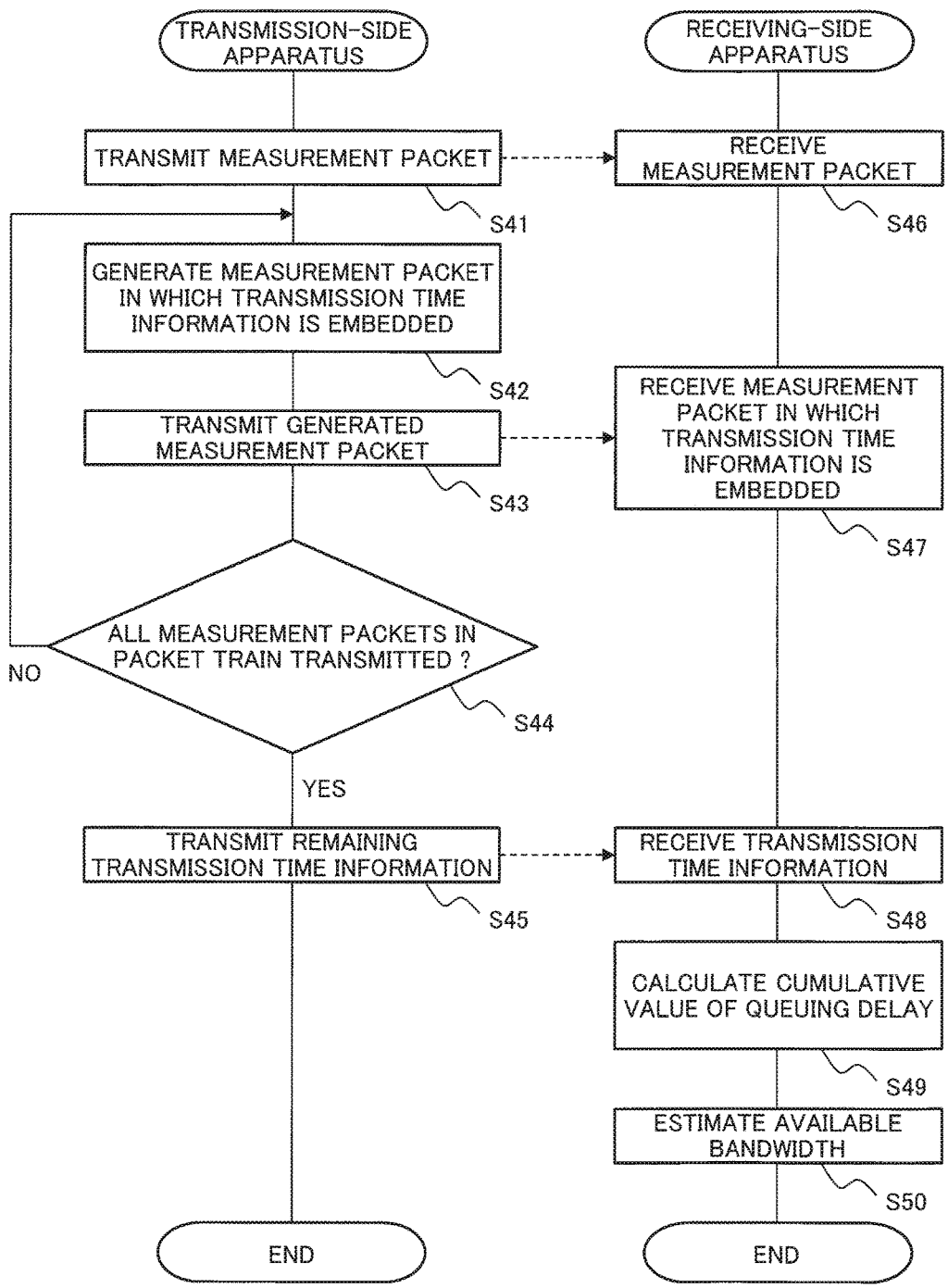
FIG. 4 is a flow chart illustrating one example of a flow of processing of the communication system according to the second exemplary embodiment of the present invention.

Next, with reference to FIG. 4, an operation of the communication system 20 according to the present exemplary embodiment will be described. FIG. 4 is a flow chart illustrating one example of a flow of processing of the communication system 20 according to the exemplary embodiment.

In FIG. 4, a flow chart on the left represents a flow of processing of the transmission-side apparatus 101, and a flow chart on the right represents a flow of processing of the receiving-side apparatus 200. A dashed line arrow represents a flow of information (data) between the transmission-side apparatus 101 and the receiving-side apparatus 200.

First, the transmission unit 110 of the transmission-side apparatus 101 transmits at least one of a plurality of measurement packets included in a packet train to the receiving-side apparatus 200 (step S41).

Subsequently, the packet generation unit 120 of the transmission-side apparatus 101 generates a measurement packet in which transmission time information for the transmitted measurement packet is embedded (step S42). The transmission unit 110 then transmits the measurement packet generated in step S42 to the receiving-side apparatus 200 (step S43).

Here, when the transmission time information is information indicating a time at which the measurement packet is transmitted, the packet generation unit 120, after transmitting one or more measurement packets, generates the measurement packet in which the transmission time information for the transmitted measurement packet is embedded.

When the transmission time information is information indicating an actual transmission interval of the measurement packet, or information indicating a difference between the set transmission interval and the actual transmission interval, the packet generation unit 120, after transmitting two or more measurement packets, generates the measurement packet in which the transmission time information for the transmitted measurement packet is embedded.

Subsequently, the packet generation unit 120 of the transmission-side apparatus 101 confirms whether the transmission unit 110 has transmitted all measurement packets in the transmit packet train (step S44). When not all the measurement packets in the packet train are transmitted (NO in step S44), the transmission-side apparatus 101 repeats step S42 and step S43.

When all the measurement packets in the packet train are transmitted (YES in step S44), the transmission unit 110 of the transmission-side apparatus 101 transmits transmission time information which has not been transmitted (remaining transmission time information) to the receiving-side apparatus 200 (step S45), and terminates the processing on the transmission-side apparatus 101 side.

Next, an operation of the receiving-side apparatus 200 will be described.

The reception unit 210 of the receiving-side apparatus 200 receives the measurement packet transmitted from the transmission-side apparatus 101 in step S41 (step S46).

The reception unit 210 then receives the measurement packet in which the transmission time information is embedded and which is transmitted from the transmission-side apparatus 101 in step S43 (step S47).

Further, the reception unit 210 receives the remaining transmission time information transmitted from the transmission-side apparatus 101 in step S45 (step S48).

The available bandwidth estimation unit 220 then calculates a cumulative queuing delay by using reception time information of a plurality of measurement packets (the packet train) received by the reception unit 210 in steps S46 and S47 and the transmission time information received by the reception unit 210 in step S48 (step S49).

Subsequently, the available bandwidth estimation unit 220 of the receiving-side apparatus 200 estimates an available bandwidth by using the calculated cumulative queuing delay (step S50), and terminates the processing.

(Effect)

By the communication system 20 according to the present exemplary embodiment, an effect according to the above-described first exemplary embodiment is obtained, and further, the number of communications between the transmission-side apparatus 101 and the receiving-side apparatus 200 can be reduced.

This is because the packet generation unit 120 of the transmission-side apparatus 101 generates a measurement packet obtained by combining transmission time information for the transmitted measurement packet and a measurement packet which has not been transmitted. This is also because the transmission unit 110 of the transmission-side apparatus 101 transmits the generated measurement packet to the receiving-side apparatus 200.

As described above, transmission by combining the transmission time information and the measurement packet can reduce the number of communications compared with the case in which the transmission time information and the measurement packet are transmitted separately.

<Third Exemplary Embodiment>

Next, a third exemplary embodiment of the present invention will be described with reference to drawings. For the convenience of explanation, a member having the same function as that of a member included in the drawings described in the above-described first and second exemplary embodiments is denoted by the same reference sign, and the description thereof will be omitted.

In the above-described first and second exemplary embodiments, description of an example in which the receiving-side apparatus 200 estimates an available bandwidth has been made, but the present exemplary embodiment is not limited thereto. An available bandwidth may be estimated by a transmission-side apparatus. In the present exemplary embodiment, a configuration in which a transmission-side apparatus estimates an available bandwidth will be described.

Figure 5:
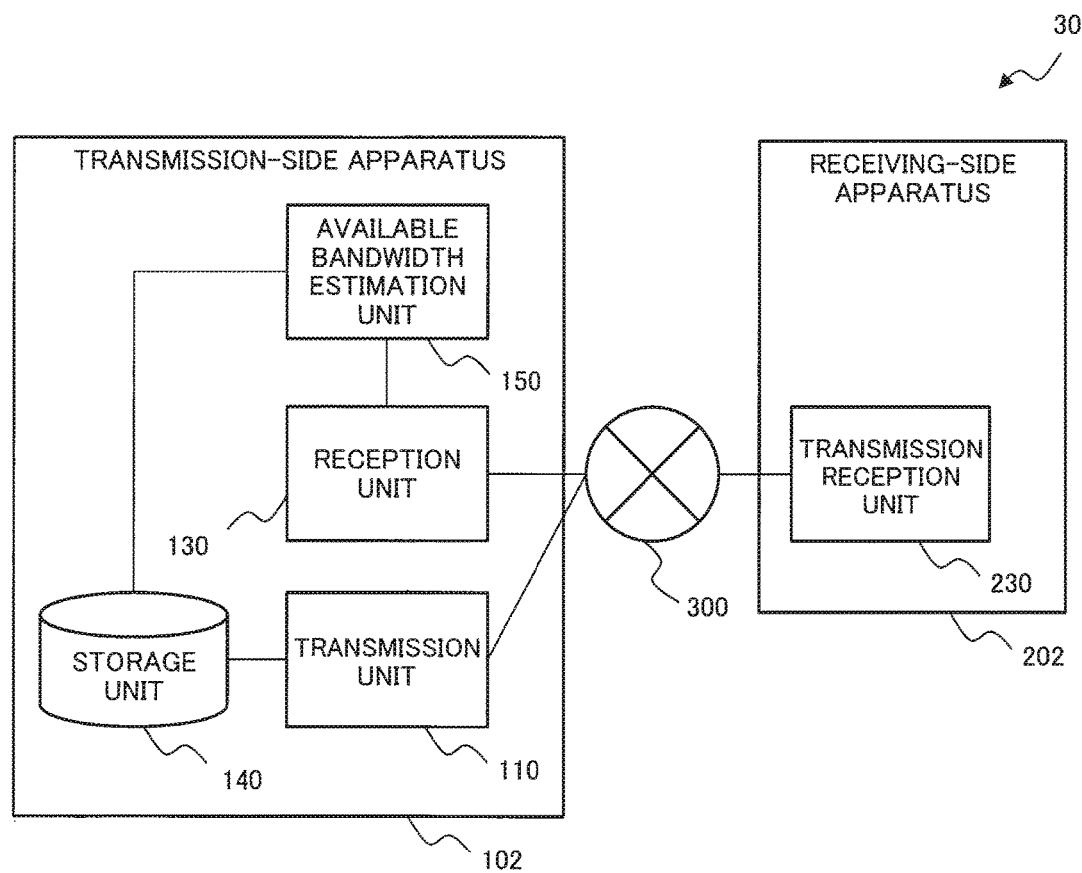
FIG. 5 is a diagram illustrating one example of a configuration of a communication system and a functional configuration of each apparatus included in the communication system according to a third exemplary embodiment of the present invention.

FIG. 5 is a diagram illustrating one example of a configuration of a communication system and a functional configuration of each apparatus included in the communication system according to the exemplary embodiment. As shown in FIG. 5, a communication system 30 includes a transmission-side apparatus 102 and a receiving-side apparatus 202. Similarly to the above-described first and second exemplary embodiments, the transmission-side apparatus 102 and the receiving-side apparatus 202 are communicatively connected with each other via the network 300. Similarly to the first exemplary embodiment, communication means between apparatuses is not particularly limited.

(Receiving-Side Apparatus 202)

As shown in FIG. 5, the receiving-side apparatus 202 includes a transmission reception unit 230.

The transmission reception unit 230 receives a plurality of measurement packets constituting a packet train transmitted from the transmission-side apparatus 102 via the network 300. The transmission reception unit 230 then returns the received measurement packet to the transmission-side apparatus 102. The transmission reception unit 230 may be realized, for example, by a passive component such as a circulator.

(Transmission-Side Apparatus 102)

As shown in FIG. 5, the transmission-side apparatus 102 includes a transmission unit 110, a reception unit 130, a storage unit 140, and an available bandwidth estimation unit 150.

The reception unit 130 receives a plurality of measurement packets returned from the receiving-side apparatus 202. The reception unit 130 then provides reception time information of the received measurement packets to the available bandwidth estimation unit 150.

The storage unit 140 is means for storing transmission time information of a measurement packet transmitted by the transmission unit 110. The transmission unit 110 stores the transmission time information in the storage unit 140. FIG. 5 is a configuration in which the storage unit 140 is included in the transmission-side apparatus 102, but the present exemplary embodiment is not limited thereto. The storage unit 140 may be a storage apparatus which is connected outside the transmission-side apparatus 102.

The available bandwidth estimation unit 150 calculates a cumulative value of a queuing delay by using the reception time information indicating temporal information about reception of the measurement packet returned from the receiving-side apparatus 202 and the transmission time information indicating temporal information about transmission of the measurement packet. Similarly to the available bandwidth estimation unit 220 according to the first exemplary embodiment, the available bandwidth estimation unit 150 estimates an available bandwidth by using the calculated cumulative value of the queuing delay.

(Operation of Communication System 30)

Figure 6:
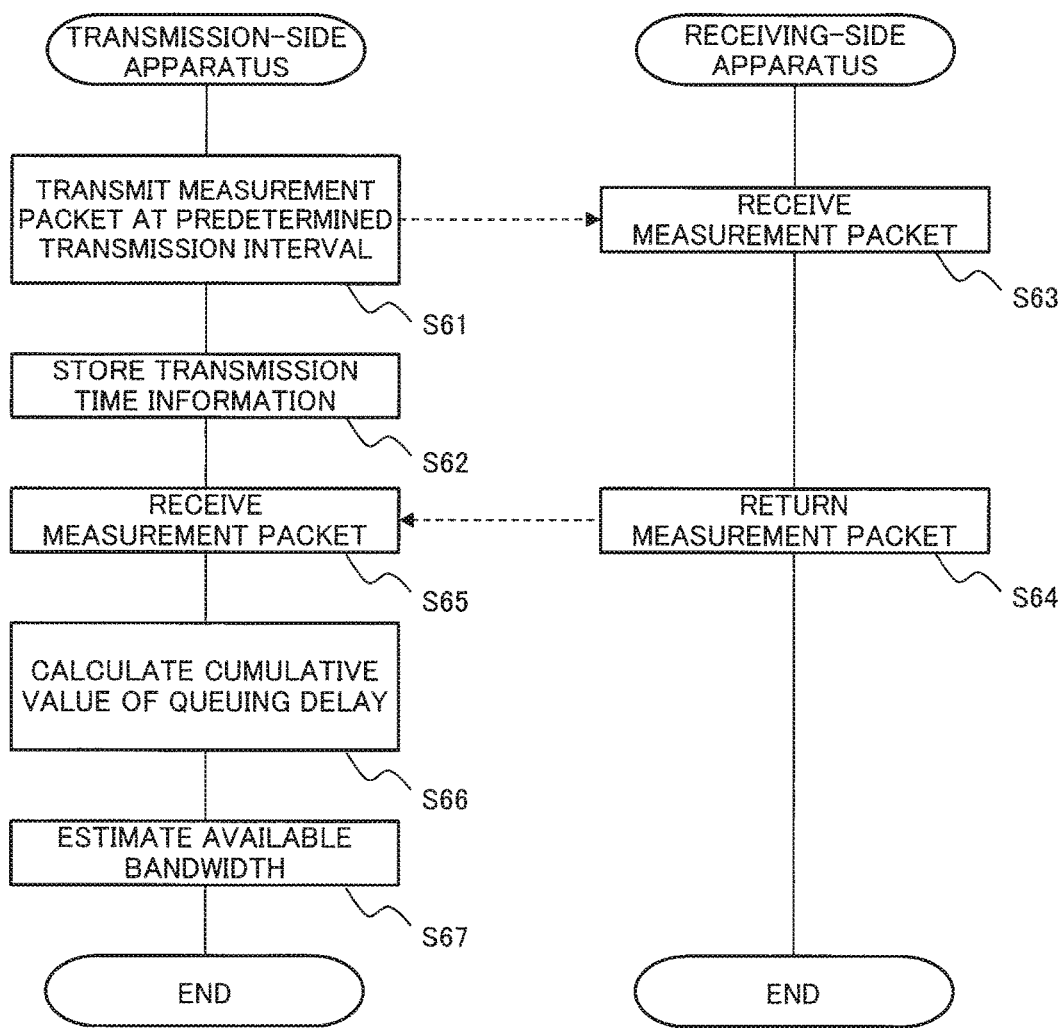
FIG. 6 is a flow chart illustrating one example of a flow of processing of the communication system according to the third exemplary embodiment of the present invention.

Next, with reference to FIG. 6, an operation of the communication system 30 according to the present exemplary embodiment will be described. FIG. 6 is a flow chart illustrating one example of a flow of processing of the communication system 30 according to the exemplary embodiment.

In FIG. 6, a flow chart on the left represents a flow of processing of the transmission-side apparatus 102, and a flow chart on the right represents a flow of processing of the receiving-side apparatus 202. A dashed line arrow represents a flow of information (data) between the transmission-side apparatus 102 and the receiving-side apparatus 202.

First, the transmission unit 110 of the transmission-side apparatus 102 sequentially transmits a plurality of measurement packets included in a packet train at the predetermined transmission interval to the receiving-side apparatus 202 (step S61).

The transmission unit 110 of the transmission-side apparatus 102 then stores transmission time information of the transmitted measurement packet in the storage unit 140 (step S62). Step S62 may be performed in parallel with step S61.

On the other hand, the transmission reception unit 230 of the receiving-side apparatus 202 receives the measurement packet transmitted from the transmission-side apparatus 102 in step S61 (step S63). Immediately after receiving the measurement packet, the transmission reception unit 230 of the receiving-side apparatus 202 returns the received measurement packet to the transmission-side apparatus 102 (step S64), and terminates the processing of the receiving-side apparatus 202.

Subsequently, the reception unit 130 of the transmission-side apparatus 102 receives the measurement packet transmitted (returned) from the receiving-side apparatus 202 in step S64 (step S65).

The available bandwidth estimation unit 150 of the transmission-side apparatus 102 calculates a cumulative queuing delay by using the transmission time information stored in the storage unit 140 in step S62 and a plurality of measurement packets (a packet train) received by the reception unit 130 in step S65 (step S66).

Subsequently, the available bandwidth estimation unit 150 of the transmission-side apparatus 102 estimates an available bandwidth by using the calculated cumulative queuing delay (step S67), and terminates the processing.

Next, a flow of the communication system 30 according to the present exemplary embodiment will be described by example. The transmission-side apparatus 102 and the receiving-side apparatus 202 of the communication system 30 are communicable with each other by UDP.

Here, a preset packet interval (set transmission interval) of a packet train is 1 ms. The packet train consists of five measurement packets, whose packet sizes are 100 bytes, 110 bytes, 120 bytes, 130 bytes, and 140 bytes, respectively.

In the present specific example, transmission time information and reception time information are an actual transmission interval and a reception interval, respectively. It is assumed that the order of measurement packets are not changed in a network, and actual transmission intervals and reception intervals are both in the order in which packets are transmitted.

The transmission unit 110 tries transmission at the set transmission interval. In this case, a transmission interval actually transmitted by the transmission unit 110 is 1.0 ms, 0.8 ms, 0.9 ms, and 0.9 ms in the order in which the measurement packets are transmitted. The transmission unit 110 stores the actual transmission intervals "1.0 ms, 0.8 ms, 0.9 ms, 0.9 ms" as transmission time information to the storage unit 140.

The transmission reception unit 230 of the receiving-side apparatus 202 receives the packet train transmitted by the transmission unit 110, and returns the measurement packet included in the packet train to the transmission-side apparatus 102 immediately after the reception of the packet train.

The reception unit 130 of the transmission-side apparatus 102 then receives the returned measurement packet. In this case, reception intervals at which the reception unit 130 received measurement packets are 1.0 ms, 1.0 ms, 1.0 ms, and 1.0 ms in the order in which the measurement packets are received. The reception unit 130 provides the reception intervals, "1.0 ms, 1.0 ms, 1.0 ms, 1.0 ms" as the reception time information to the available bandwidth estimation unit 150.

The available bandwidth estimation unit 150 of the transmission-side apparatus 102 acquires the transmission time information from the storage unit 140. The available bandwidth estimation unit 150 then calculates a cumulative queuing delay by using the acquired transmission time information and the reception time information provided from the reception unit 130. The available bandwidth estimation unit 150 calculates the cumulative queuing delay "0 ms, 0.2 ms, 0.3 ms, 0.4 ms" from the reception time information and the transmission time information.
(Effect)

As described above, the communication system 30 according to the present exemplary embodiment includes the transmission-side apparatus 102 and the receiving-side apparatus 202 which are communicatively connected with each other via the network 300.

Similarly to the first exemplary embodiment, by such a communication system 30, an available bandwidth can be estimated with higher precision.

This is because the transmission unit 110 of the transmission-side apparatus 102 transmits each of a plurality of measurement packets at a predetermined transmission interval, and the reception unit 130 receives the plurality of measurement packets returned from the receiving-side apparatus 202. This is also because the available bandwidth estimation unit 150 calculates a cumulative value of a queuing delay by using reception time information and transmission time information, and estimates an available bandwidth by using the calculated cumulative value of the queuing delay.

For example, when the transmission-side apparatus 102 calculates a cumulative queuing delay without using transmission time information, since the set transmission interval agrees with the reception interval, the cumulative queuing delay is "0 ms, 0 ms, 0 ms, 0 ms".

However, since the transmission-side apparatus 102 in the communication system 30 according to the present exemplary embodiment calculates a cumulative queuing delay by using transmission time information which is an actual transmission interval or the like, a difference between the actual transmission interval and the reception interval, "0 ms, 0.2 ms, 0.1 ms, 0.1 ms" can be obtained. Therefore, a cumulative queuing delay is "0 ms, 0.2 ms, 0.3 ms, 0.4 ms", and the transmission-side apparatus 102 can calculate the cumulative queuing delay reflecting an actual amount of delay.

By this, the available bandwidth estimation unit 150 can estimate an available bandwidth by using the cumulative value of the queuing delay calculated by using the actual transmission interval.

The receiving-side apparatus 202 of the communication system 30 according to the present exemplary embodiment is realized by a simpler configuration than that of the receiving-side apparatus 200 of the first exemplary embodiment. As described above, by the communication system 30 according to the present exemplary embodiment, the configuration of the receiving-side apparatus 202 can be made simple, and therefore, the versatility of the system can be enhanced.

Since the communication system 30 does not perform communication for utilizing the transmission time information, load applied on the network 300 can be reduced compared with the communication system according to the first or second exemplary embodiment.

<Fourth Exemplary Embodiment>

Figure 7:
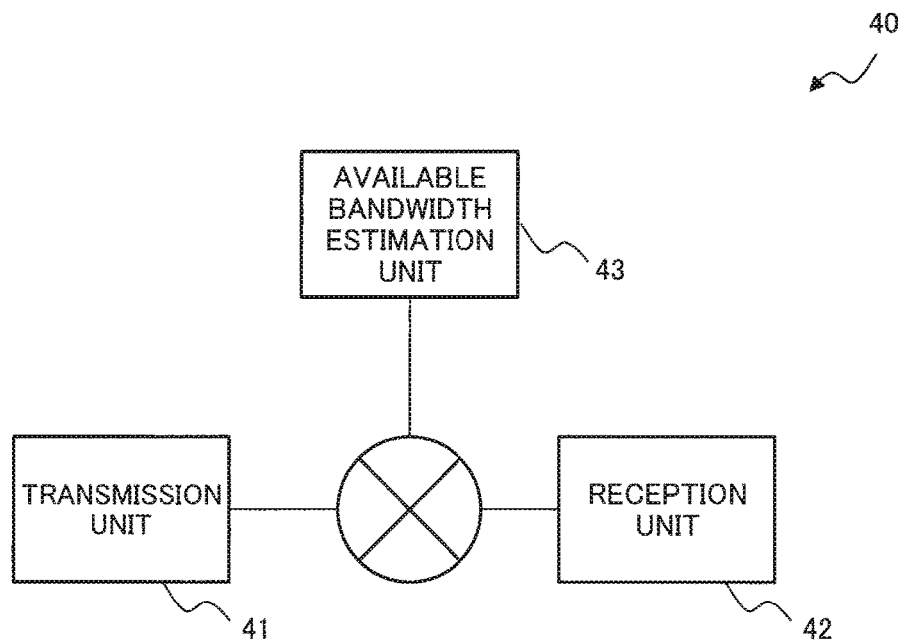
FIG. 7 is a diagram illustrating one example of a configuration of a communication system according to a fourth exemplary embodiment of the present invention.

Next, a fourth exemplary embodiment according to the present invention will be described with reference to drawings. In the present exemplary embodiment, a minimum configuration which solves a problem of the present invention will be described. FIG. 7 is a diagram illustrating one example of a configuration of the communication system 40 according to the present exemplary embodiment.

As shown in FIG. 7, the communication system 40 includes a transmission unit 41, a reception unit 42, and an available bandwidth estimation unit 43.

The transmission unit 41 transmits each of a plurality of measurement packets at a predetermined transmission interval. The transmission unit 41, for example, corresponds to the transmission unit 110 included in the above-described transmission-side apparatuses (100, 101, and 102). The transmission unit 41 stores transmission time information indicating temporal information about transmission of a measurement packets on a network or a storage unit (not illustrated) which can store the transmission time information.

The reception unit 42 receives a plurality of measurement packets which have passed through a predetermined network for a predetermined number of times. The reception unit 42, for example, corresponds to the reception unit 210 of the receiving-side apparatus 200 or the reception unit 130 of the transmission-side apparatus 102 described above. The reception unit 42 stores reception time information indicating temporal information about reception of the measurement packets on a network or a storage unit (not illustrated) which can store the transmission time information.

The available bandwidth estimation unit 43 calculates a cumulative value of a queuing delay by using the reception time information and the transmission time information, and estimates an available bandwidth of the network by using the calculated cumulative value of a queuing delay. The available bandwidth estimation unit 43, for example, corresponds to the available bandwidth estimation unit 220 of the receiving-side apparatus 200 or the available bandwidth estimation unit 150 of the transmission-side apparatus 102 described above. The available bandwidth estimation unit 43 calculates a cumulative value of a queuing delay by using the reception time information and the transmission time information stored in a storage unit or received via a network.

Similarly to the communication system according to each of the above-described exemplary embodiments, by the communication system 40 according to the present exemplary embodiment, an available bandwidth of a network can be estimated with a higher precision.

(About Hardware Configuration)

Figure 8:
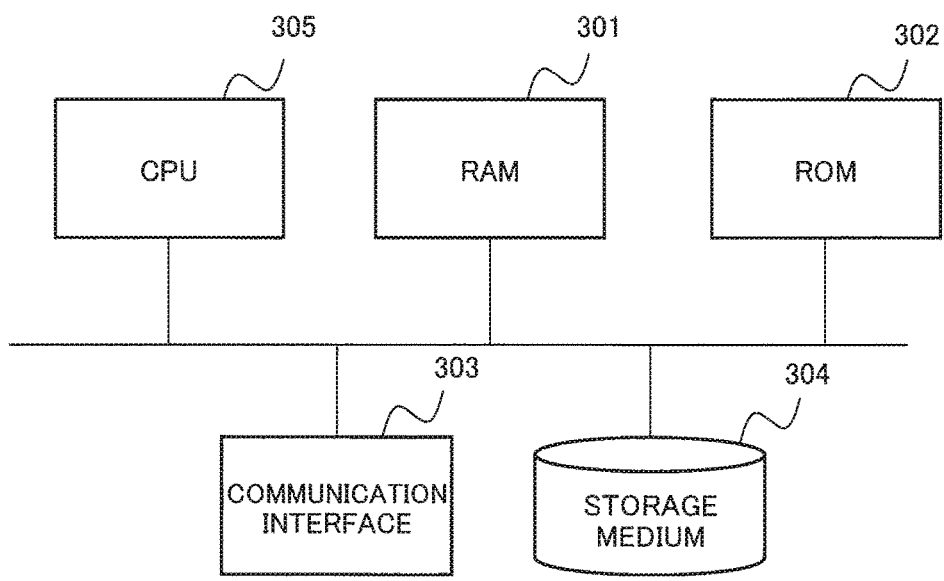
FIG. 8 is a diagram illustrating one example of a hardware configuration of a transmission-side apparatus and a receiving-side apparatus according to each exemplary embodiment of the present invention.

Each unit of the transmission-side apparatuses and the receiving-side apparatuses as illustrated in FIGS. 1, 3, 5, and 7 may be realized by hardware resources illustrated in FIG. 8. That is, a configuration illustrated in FIG. 8 includes a RAM (Random Access Memory) 301, a ROM (Read Only Memory) 302, a communication interface 303, a storage medium 304, and a CPU (Central Processing Unit) 305. The CPU 305 controls overall operations of the transmission-side apparatuses or the receiving-side apparatuses by loading various software programs (computer programs) stored in the ROM 302 or the storage medium 304 into the RAM 301 and executing the software programs. That is, in each of the above-described exemplary embodiments, the CPU 305 executes a software program which executes each function (each unit) of the transmission-side apparatuses and the receiving-side apparatuses with reference to the ROM 302 or the storage medium 304 as appropriate.

The present invention which has been described using each of the exemplary embodiments as an example is realized when a computer program which can realize the above-described function is provided to each of the transmission-side apparatuses and the receiving-side apparatuses, and then, the CPU 305 loads the computer program in the RAM 301 and executes the computer program.

The provided computer program may be stored in a computer-readable storage device such as a readable and writable memory (temporary storage medium) or a hard disk apparatus. In such cases, it is understood that the present invention is configured by a code representing such a computer program or a storage medium storing such a computer program.

In each of the above-described exemplary embodiments, one example in which the CPU 305 illustrated in FIG. 8 executes a function in each block of the transmission-side apparatuses and the receiving-side apparatuses illustrated in FIGS. 1, 3, 5, and 7 realized by a software program has been described. However, a function of each block illustrated in FIGS. 1, 3, 5, and 7 may be realized by a hardware circuit in part or as a whole.

The above-described exemplary embodiments are suitable exemplary embodiments according to the present invention, and the scope of the present invention is not limited only to each of the above-described exemplary embodiments. Each of the above-described exemplary embodiments may be modified or substituted by those skilled in the art without departing from the gist of the present invention, and a variety of forms in which a change is applied to the exemplary embodiment can be constructed.

A portion of or the whole of the exemplary embodiment described above can be described in the following Supplementary notes, but not limited thereto.

(Supplementary note 1) A communication system including: transmission means for transmitting each of a plurality of measurement packets at a predetermined transmission interval; reception means for receiving the plurality of measurement packets which have passed through a predetermined network for a predetermined number of times; and available bandwidth estimation means for calculating a cumulative value of a queuing delay by using reception time information indicating temporal information about reception of the measurement packets and transmission time information indicating temporal information about transmission of the measurement packets, and for estimating an available bandwidth of the network by using the calculated cumulative value of the queuing delay.

(Supplementary note 2) The communication system according to Supplementary note 1, wherein the communication system includes a transmission-side apparatus and a receiving-side apparatus which are communicatively connected with each other via the network, wherein the transmission-side apparatus includes the transmission means, wherein the transmission means transmits the plurality of measurement packets and the transmission time information, wherein the receiving-side apparatus includes the reception means and the available bandwidth estimation means, wherein the reception means receives the plurality of measurement packets and the transmission time information transmitted from the transmission-side apparatus, and wherein the available bandwidth estimation means calculates the cumulative value of the queuing delay by using the reception time information and the transmission time information received by the reception means.

(Supplementary note 3) The communication system according to Supplementary note 2, wherein the transmission-side apparatus further includes packet generation means for generating a measurement packet obtained by combining the transmission time information for a transmitted measurement packet and a measurement packet which has not been transmitted, and wherein the transmission means transmits the measurement packet generated by the packet generation means.

(Supplementary note 4) The communication system according to Supplementary note 1, further including at least one transmission reception means for reinputting the measurement packet to the network for next passage after the predetermined number of times of the passages.

(Supplementary note 5) The communication system according to Supplementary note 4, wherein the communication system includes a transmission-side apparatus and a receiving-side apparatus which are communicatively connected with each other via the network, wherein the transmission-side apparatus includes the transmission means, the reception means, and the available bandwidth estimation means, wherein the receiving-side apparatus includes the transmission reception means, wherein the reception means receives the plurality of measurement packets returned from the receiving-side apparatus, and wherein the available bandwidth estimation means calculates the cumulative value of the queuing delay by using the reception time information and the transmission time information.

(Supplementary note 6) The communication system according to Supplementary note 5, wherein the transmission-side apparatus further includes storage means for storing the transmission time information.

(Supplementary note 7) The communication system according to any one of Supplementary notes 1 to 6, wherein the transmission time information is at least any one of information indicating a time at which the measurement packet is transmitted, information indicating an actual transmission interval of the measurement packet, and information indicating a difference between a set transmission interval and the actual transmission interval.

(Supplementary note 8) A receiving-side apparatus which receives data from a transmission-side apparatus communicatively connected via a network, including: reception means for receiving a plurality of measurement packets, and transmission time information indicating temporal information about transmission of the measurement packets transmitted from the transmission-side apparatus; and available bandwidth estimation means for calculating a cumulative value of a queuing delay by using reception time information indicating temporal information about reception of the measurement packets and the transmission time information received by the reception means, and for estimating an available bandwidth by using the calculated cumulative value of the queuing delay.

(Supplementary note 9) The receiving-side apparatus according to Supplementary note 8, wherein the transmission time information is at least any one of information indicating a time at which the measurement packet is transmitted, information indicating an actual transmission interval of the measurement packet, and information indicating a difference between a set transmission interval and the actual transmission interval.

(Supplementary note 10) A transmission-side apparatus which transmits data to a receiving-side apparatus communicatively connected via a network, including: transmission means for transmitting each of a plurality of measurement packets to the receiving-side apparatus at a predetermined transmission interval; reception means for receiving the plurality of measurement packets returned from the receiving-side apparatus; and available bandwidth estimation means for calculating a cumulative value of a queuing delay by using reception time information indicating temporal information about reception of the measurement packets and transmission time information indicating temporal information about transmission of the measurement packets, and for estimating an available bandwidth by using the calculated cumulative value of the queuing delay.

(Supplementary note 11) The transmission-side apparatus according to Supplementary note 10, further including storage means for storing the transmission time information.

(Supplementary note 12) The transmission-side apparatus according to Supplementary note 10 or 11, wherein the transmission time information is at least any one of information indicating a time at which the measurement packet is transmitted, information indicating an actual transmission interval of the measurement packet, and information indicating a difference between a set transmission interval and the actual transmission interval.

(Supplementary note 13) A communication method including: transmitting each of a plurality of measurement packets at a predetermined transmission interval; receiving the plurality of measurement packets which have passed through a predetermined network for a predetermined number of times; and calculating a cumulative value of a queuing delay by using reception time information indicating temporal information about reception of the measurement packets and transmission time information indicating temporal information about transmission of the measurement packets, and estimating an available bandwidth of the network by using the calculated cumulative value of the queuing delay.

(Supplementary note 14) The communication method according to Supplementary note 13, wherein the transmission time information is at least any one of information indicating a time at which the measurement packet is transmitted, information indicating an actual transmission interval of the measurement packet, and information indicating a difference between a set transmission interval and the actual transmission interval.

(Supplementary note 15) A method of estimating an available bandwidth of a receiving-side apparatus which receives data from a transmission-side apparatus communicatively connected via a network, including: receiving a plurality of measurement packets, and transmission time information indicating temporal information about transmission of the measurement packets transmitted from the transmission-side apparatus; and calculating a cumulative value of a queuing delay by using reception time information indicating temporal information about reception of the measurement packets and the transmission time information, and estimating an available bandwidth by using the calculated cumulative value of the queuing delay.

(Supplementary note 16) A method of estimating an available bandwidth of a transmission-side apparatus which transmits data to a receiving-side apparatus communicatively connected via a network, including: transmitting each of a plurality of measurement packets to the receiving-side apparatus at a predetermined transmission interval; receiving the plurality of measurement packets returned from the receiving-side apparatus; and calculating a cumulative value of a queuing delay by using reception time information indicating temporal information about reception of the measurement packets and transmission time information indicating temporal information about transmission of the measurement packets, and estimating an available bandwidth by using the calculated cumulative value of the queuing delay.

(Supplementary note 17) A program which causes a computer including a receiving-side apparatus which receives data from a transmission-side apparatus communicatively connected via a network, to execute: a process of receiving a plurality of measurement packets, and transmission time information indicating temporal information about transmission of the measurement packets transmitted from the transmission-side apparatus; and a process of calculating a cumulative value of a queuing delay by using reception time information indicating temporal information about reception of the measurement packets and the transmission time information, and estimating an available bandwidth by using the calculated cumulative value of the queuing delay.

(Supplementary note 18) A program which causes a computer including a transmission-side apparatus which transmits data to a receiving-side apparatus communicatively connected via a network, to execute: a process of transmitting each of a plurality of measurement packets to the receiving-side apparatus at a predetermined transmission interval; a process of receiving the plurality of measurement packets returned from the receiving-side apparatus; and a process of calculating a cumulative value of a queuing delay by using reception time information indicating temporal information about reception of the measurement packets and transmission time information indicating temporal information about transmission of the measurement packets, and estimating an available bandwidth by using the calculated cumulative value of the queuing delay.

(Supplementary note 19) A computer-readable recording medium which stores the program according to Supplementary note 17 or 18.

This application claims the priority based on Japanese Patent Application No. 2014-100059 filed on May 14, 2014, the entire disclosure of which is incorporated herein by reference.

REFERENCE SIGNS LIST 10 communication system
20 communication system
30 communication system
40 communication system
100 transmission-side apparatus
101 transmission-side apparatus
102 transmission-side apparatus
110 transmission unit
120 packet generation unit
130 reception unit
140 storage unit
150 available bandwidth estimation unit
200 receiving-side apparatus
202 receiving-side apparatus
210 reception unit
220 available bandwidth estimation unit
230 transmission reception unit
41 transmission unit
42 reception unit
43 available bandwidth estimation unit

What is claimed is:

1. A communication system comprising:
a transmission-side apparatus; and
a receiving-side apparatus connected with the transmission-side apparatus via a predetermined network,
the transmission-side apparatus comprising a memory storing instructions and at least one processor coupled to the memory that the processor is configured to execute to:
transmit each of a plurality of measurement packets and transmission time information at a predetermined transmission interval;
the receiving-side apparatus comprising a second memory storing second instructions and at least one second processor coupled to the second memory that the second processor is configured to execute to:
receive the plurality of measurement packets and the transmission time information that have passed through the predetermined network for a predetermined number of times from the transmission-side apparatus;
calculate a cumulative value of a queuing delay by using reception time information indicating temporal information about reception of the measurement packets and transmission time information indicating temporal information about transmission of the measurement packets, and estimate an available bandwidth of the network by using the calculated cumulative value of the queuing delay,
wherein the transmission-side apparatus generates the measurement packet obtained by combining only one piece of the transmission time information for the measurement packet that has been transmitted with the measurement packet that has not been transmitted; and
wherein the transmission-side apparatus transmits the measurement packet generated,
wherein communication over the network subsequently occurs using the available bandwidth of the network as has been estimated.

2. The communication system according to claim 1,
wherein the transmission-side apparatus is to reinput the measurement packet to the network for next passage after the predetermined number of times of the passages.

3. The communication system according to claim 2,
wherein the receiving-side apparatus is to calculate the cumulative value of the queuing delay by using the reception time information and the transmission time information.

4. The communication system according to claim 3,
wherein the transmission-side apparatus further is configured to store the transmission time information.

5. The communication system according to claim 1,
wherein the transmission time information is at least any one of information indicating a time at which the measurement packet is transmitted, information indicating an actual transmission interval of the measurement packet, and information indicating a difference between a set transmission interval and the actual transmission interval.

6. A receiving-side apparatus which receives data from a transmission-side apparatus communicatively connected via a network, comprising:
at least one processor; and
a memory storing instructions that the at least one processor is configured to execute to:
receive a plurality of measurement packets, and transmission time information indicating temporal information about transmission of the measurement packets transmitted from the transmission-side apparatus; and
calculate a cumulative value of a queuing delay by using reception time information indicating temporal information about reception of the measurement packets and the transmission time information, and estimate an available bandwidth by using the calculated cumulative value of the queuing delay,
wherein communication over the network subsequently occurs using the available bandwidth of the network as has been estimated,
and wherein the transmission-side apparatus generates the measurement packet obtained by combining only one piece of the transmission time information for the measurement packet that has been transmitted with the measurement packet that has not been transmitted.

7. The receiving-side apparatus according to claim 6,
wherein the transmission time information is at least any one of information indicating a time at which the measurement packet is transmitted, information indicating an actual transmission interval of the measurement packet, and information indicating a difference between a set transmission interval and the actual transmission interval.

8. A transmission-side apparatus which transmits data to a receiving-side apparatus communicatively connected via a network, comprising:
at least one processor; and
a memory storing instructions that the at least one processor is configured to execute to:
transmit each of a plurality of measurement packets to the receiving-side apparatus at a predetermined transmission interval;
receive the plurality of measurement packets returned from the receiving-side apparatus;

calculate a cumulative value of a queuing delay by using reception time information indicating temporal information about reception of the measurement packets and transmission time information indicating temporal information about transmission of the measurement packets, and estimate an available bandwidth by using the calculated cumulative value of the queuing delay;

generate and transmitted the measurement packet obtained by combining only one piece of the transmission time information for the measurement packet that has been transmitted with the measurement packet that has not been transmitted;

wherein communication over the network subsequently occurs using the available bandwidth of the network as has been estimated.

* * * * *